United States Patent [19]

Iwata et al.

[11] Patent Number: 4,947,325
[45] Date of Patent: Aug. 7, 1990

[54] DIAGNOSTIC SYSTEM FOR ROTATIONAL SPEED SENSORS IN DRIVE TRAIN OF FOUR WHEELS DRIVE VEHICLE HAVING CENTRAL DIFFERENTIAL DEVICE

[75] Inventors: Yasunari Iwata, Toyota; Seiichi Nishikawa, Toyokawa; Yuji Ichikawa, Toyota, all of Japan

[73] Assignee: Toyota Jidosha Kabushiki Kaisha, Japan

[21] Appl. No.: 362,794

[22] Filed: Jun. 7, 1989

[30] Foreign Application Priority Data

Jun. 14, 1988 [JP] Japan ................................ 63-146364

[51] Int. Cl.⁵ ........................ G01M 19/00; G01P 3/04
[52] U.S. Cl. ........................... 364/424.03; 364/424.05; 364/565; 324/161; 73/118.1; 180/233; 180/249
[58] Field of Search .................. 364/424.03, 424.05, 364/565, 551.01; 73/117.3, 118.1; 324/160, 161; 180/233, 249, 234, 197

[56] References Cited

U.S. PATENT DOCUMENTS

| | | | |
|---|---|---|---|
| 4,700,563 | 6/1987 | Iwata et al. | 73/118.1 |
| 4,759,212 | 7/1988 | Sawada et al. | 73/118.1 |
| 4,776,421 | 10/1988 | Kashihara | 324/161 |
| 4,777,611 | 10/1988 | Tashiro et al. | 324/161 |
| 4,876,527 | 10/1989 | Oka et al. | 324/160 |

Primary Examiner—Gary Chin
Attorney, Agent, or Firm—Oliff & Berridge

[57] ABSTRACT

A diagnostic system for detecting failure of rotational speed sensors incorporated in a central differential device of a four wheels drive vehicle for the purpose of controlling a lock-up clutch in the central differential device, wherein the rotational speed sensor for an output rotational member of the central differential device is checked, when the rotational speed detected thereby is lower than the rotational speed detected by the other rotational sensor, if the rotational speed detected thereby is continually zero over a period such as 10 seconds while the output of the other rotational speed sensor is above a certain low value.

5 Claims, 5 Drawing Sheets

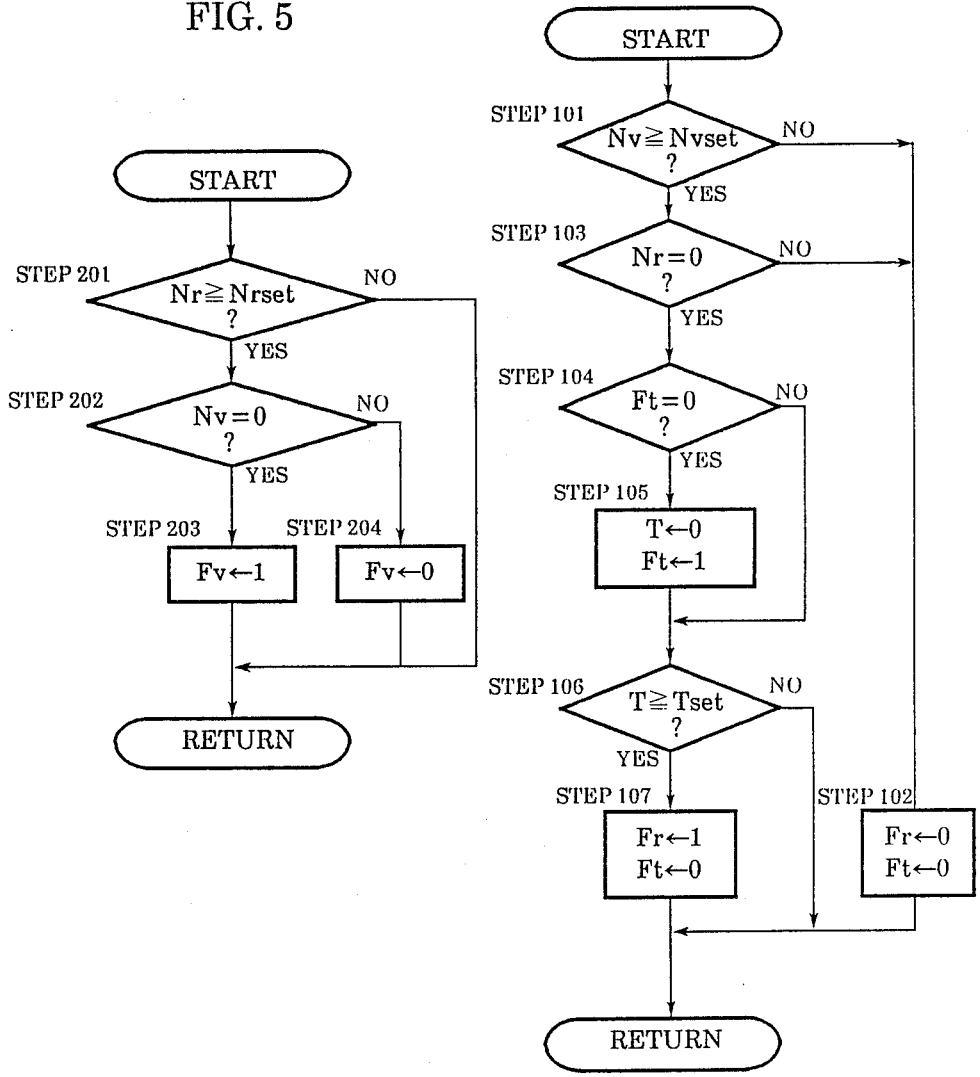

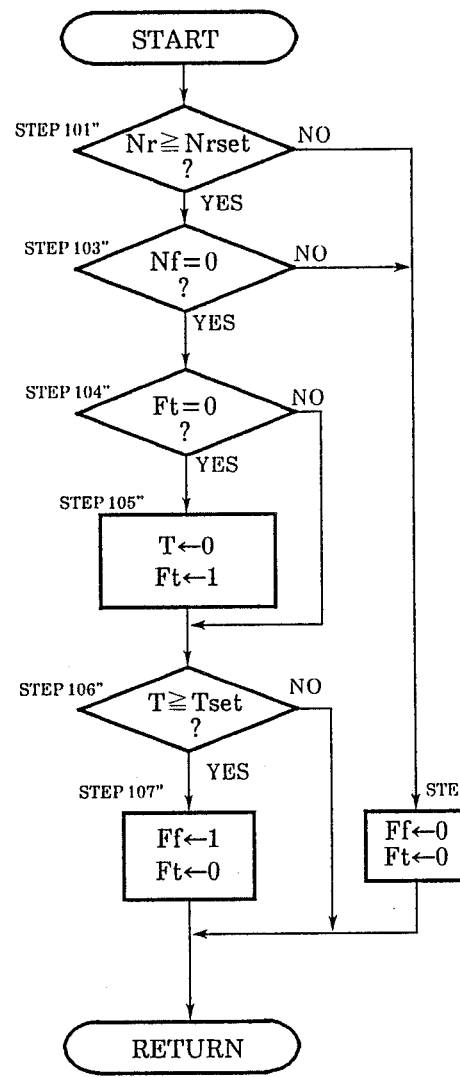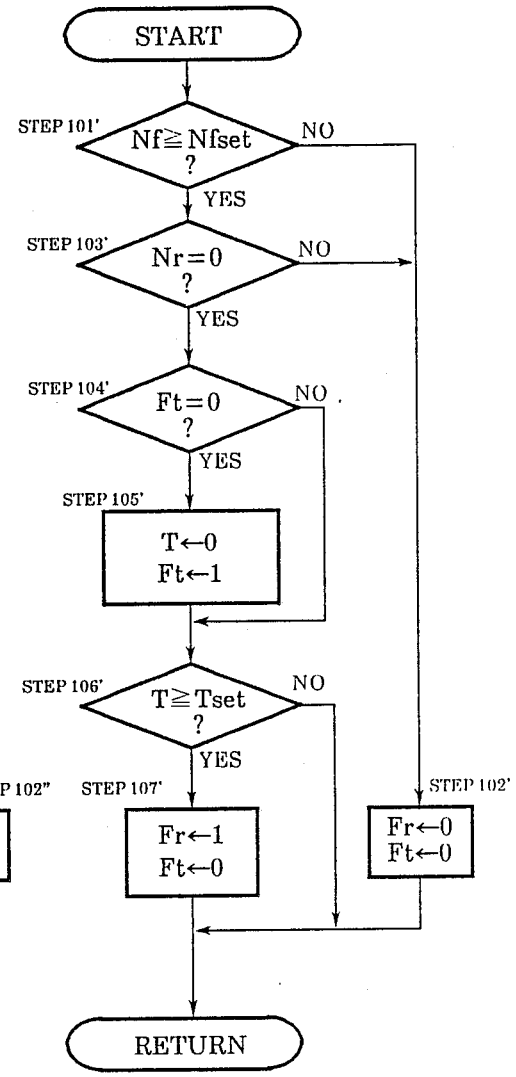
FIG. 8
FIG. 7

DIAGNOSTIC SYSTEM FOR ROTATIONAL SPEED SENSORS IN DRIVE TRAIN OF FOUR WHEELS DRIVE VEHICLE HAVING CENTRAL DIFFERENTIAL DEVICE

BACKGROUND OF THE INVENTION

1. Field of the Invention

The present invention relates to the drive train of the four wheels drive vehicle, and more particularly, to a diagnostic system for rotational speed sensors incorporated in the drive train of the four wheels drive vehicle having a central differential device.

2. Description of the Prior Art

In the drive train of the four wheels drive vehicle including a transmission such as a combination of a fluid torque converter and a speed change gear mechanism and a central differential device for distributing rotational power supplied from an engine through said transmission between a front wheel drive shaft for driving a pair of front wheels and a rear wheel drive shaft for driving a pair of rear wheels, the central differential device generally includes a lock-up clutch adapted to be selectively engaged to lock up the power differentiating operation thereof between the front wheel drive shaft and the rear wheel drive shaft so that the central differential device operates as a unitary body firmly connecting the front wheel drive shaft and the rear wheel drive shaft with the preceding speed change gear mechanism in order to meet with such a trouble that the traction of the vehicle is totally lost by either the front wheel or the rear wheel slips as caught on an icy road surface or in mud. The selective engagement of such a lock-up clutch in the central differential device can be automatically controlled so that it is automatically engaged when one of the wheels begins to slip if the rotational speed of at least two of an input rotational member and two output rotational members of the central differential device is individually detected by a rotational speed sensor and the output signals from these two rotational speed sensors are compared with one another by an appropriate comparison means.

The rotational speed sensors for such a purpose are available in various constructions such as a type in which variations of the permeability of gear teeth provided on a rotational member are picked up by an electromagnetic sensor, a type in which a reed switch opens and closes to generate a pulse signal in accordance with rotation of a magnet mounted on a rotational member, etc.. These rotational speed sensors are of course not perfectly immune to failure. If such a rotational speed sensor fails particularly in the modern four wheels drive vehicle equipped with a computer controlled automatic transmission, it may happen that the high performance to be available by such a computer controlled automatic transmission is seriously damaged without being noticed by a driver who is not very skilled in driving the vehicle.

In the art of automobile it was conventionally known to provide two sets of rotational sensors for a single rotational system to detect its rotational speed under comparison of two output signals from those two sensors so that if one of the two rotational speed sensors fails the failure is immediately detected. Such an art is not usable for the two rotational speed sensors adapted to detect the rotational speed of two of the three rotational members including an input rotational member and two output rotational members of the central differential device in the drive train of the four wheels drive vehicle, because the relation between the rotational speed of those two rotational speed sensors occasionally varies so much if one of the four wheels slips on a slippery road surface or in mud that a failure detecting means for the rotational speed sensors would be unduly triggered to dispatch an alarm when the rotational speed sensors have not yet failed.

SUMMARY OF THE INVENTION

The object of the present invention is to provide a diagnostic system which can detect a failure of such rotational speed sensors incorporated in the drive train of the four wheels drive vehicle for detecting rotational speed of two of the input rotational member and the two output rotational members of the central differential device incorporated therein for the purpose of controlling selective engagement of the lock-up clutch in the central differential device depending upon the output signals of the rotational speed sensors.

According to the present invention, the above-mentioned object is accomplished, in a four wheels drive vehicle comprising an engine, a transmission, a front wheel drive shaft, a rear wheel drive shaft, a central differential device having an input rotational member adapted to be driven by said engine through said transmission and two output rotational members adapted to drive said front wheel drive shaft and said rear wheel drive shaft, respectively, under distribution of rotational power supplied to said input rotational member between said two output rotational members, a first rotational speed sensor for detecting rotational speed of one of said two output rotational members of said central differential device, and a second rotational speed sensor for detecting rotational speed of either said input rotational member or the other of said two output rotational members of said central differential device, by a diagnostic system for detecting failure of at least said first rotational speed sensor, comprising:

a first means for comparing an output signal of said first rotational speed sensor with an output signal of said second rotational speed sensor to detect a first condition that the rotational speed detected by said first rotational speed sensor is lower than the rotational speed detected by said second rotational speed sensor, and a second means operable when said first condition was detected to detect if the rotational speed detected by said first rotational speed sensor is below a threshold value therefor while the rotational speed detected by said second rotational speed sensor is above a threshold value therefor over a first predetermined period so as thereby to determine a failure of said first rotational speed sensor.

In the above-mentioned diagnostic system, said second rotational speed sensor may detect rotational speed of said input rotational member of said central differential device, said first means may further detect a second condition that the rotational speed detected by said second rotational speed sensor is lower than the rotational speed detected by said first rotational speed sensor, and the diagnostic system may further comprise a third means operable when said second condition was detected to detect if the rotational speed detected by said second rotational speed sensor is below a threshold value therefor while the rotational speed detected by said first rotational speed sensor is above a threshold value thereof so as thereby to determine a failure of said second rotational speed sensor.

Alternatively, said second rotational speed sensor may detect rotational speed of the other of said two output rotational members of said central differential device, said first means may further detect a second condition that the rotational speed detected by said second rotational speed sensor is lower than the rotational speed detected by said first rotational speed sensor, and the diagnostic system may further comprise a fourth means operable when said second condition was detected to detect if the rotational speed detected by said second rotational speed sensor is below a threshold value therefor while the rotational speed detected by said first rotational speed sensor is above a threshold value therefor over a second predetermined period so as thereby to determine a failure of said second rotational speed sensor.

In the above-mentioned diagnostic systems said first and said second predetermined period may be set to be about 10 seconds.

Brief Description of the Drawing

In the accompanying drawings:

FIG. 3 is a flow chart showing the operation of a second means forming a part of the diagnostic system according to the present invention;

FIG. 5 is a flow chart showing the operation of a third means forming a part of the diagnostic system according to the present invention;

FIG. 7 is a flow chart showing the operation of a modified type of said second means whose operation is shown in FIG. 3; and FIG. 8 is a flow chart showing the operation of still another means to form a part of the diagnostic system according to the present invention together with the means whose operation is shown in FIG. 7.

DESCRIPTION OF THE PREFERRED EMBODIMENTS

In the following the present invention will be described in more details with respect to some preferred embodiments thereof with reference to the accompanying drawings.

Figure 1:
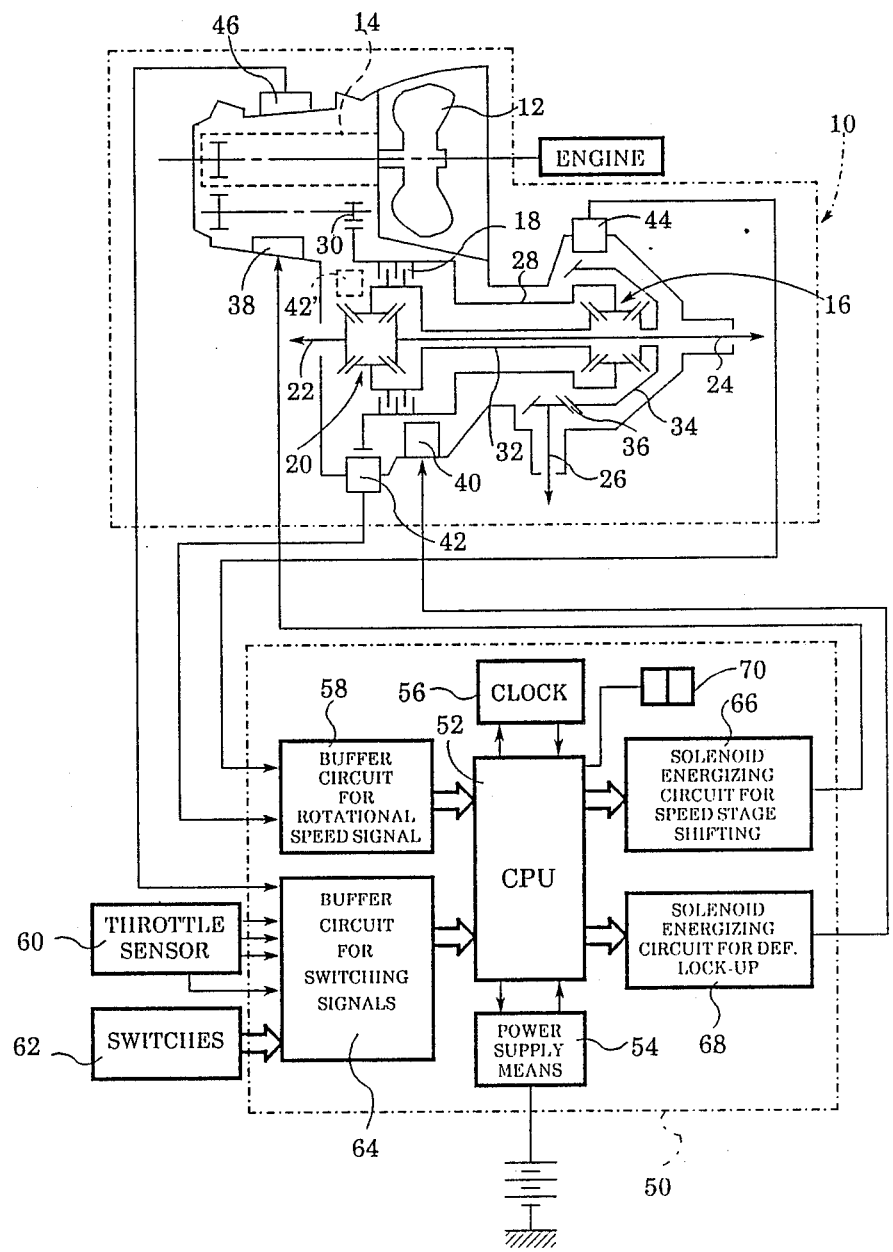
FIG. 1 is a diagrammatical illustration of a transmission system for a four wheels drive vehicle in which the present invention is incorporated.

Referring to FIG. 1, an automatic transmission generally designated by 10 for a four wheels drive vehicle comprises a fluid torque converter 12, a speed change gear mechanism 14 and a central differential device 16 connected in series as viewed along the flow of rotational power. The central differential device comprises an input rotational member 28 in the shape of a hollow shaft adapted to be driven by an output rotational member 30 of the speed change gear mechanism 14 and to drive a pair of bevel gears meshing with another pair of bevel gears each of which is integrally connected with a hollow shaft 32 forming one of the two output rotational members of the center differential device and a cone shaped rotational member 34 forming the other of the two output rotational members of the center differential device, respectively. The hollow shaft 32 drives front wheels (not shown in the figure) via a front differential device 20 having a pair of bevel gears adapted to be driven by the hollow shaft 32 and another pair of bevel gears each of which is integrally connected with a left front wheel drive shaft 22 and a right front wheel drive shaft 24, respectively. The cone shaped rotational member 34 drives rear wheels (not shown in the figure) via a bevel gear train 36 and a rear wheel drive shaft 26. A lock-up clutch 18 is provided between the input rotational member 28 and the one output rotational member 32 so as selectively to connect these two rotational members for the purpose of locking up the power differentiating function of the center differential device 16. However, the central differential device may be of a sliding clutch type which allows distribution of rotational power between the front wheels and the rear wheels to change according to the degree of engagement of a clutch.

Changing over of the speed change gear mechanism 14 between various speed stages is effected by a solenoid 38, and the engagement and disengagement of the lock up clutch 18 is effected by a solenoid 40. These constructions are conventional in the art of automatic transmission for a four wheels drive vehicle.

The rotational speed of the input rotational member 28 of the center differential device 16 is detected by a rotational speed sensor 42 which may be of any conventional type, and the rotational speed of the output rotational member 34 of the center differential device 16 is detected by a rotational speed sensor 44 which may also be of any conventional type.

A control system for operating the automatic transmission 10 is totally designated by 50. The control system comprises an electronic central processing unit (CPU) 52, a power supply means 54 supplying the CPU with a constant voltage electric power and a buffer voltage electric power, a clock means 56 supplying the CPU with a standard clock signal, a buffer circuit 58 for rotational speed signals supplying the CPU with rotational speed information with regard to the input rotational member 28 and the output rotational member 34 of the center differential device 16 detected by the rotational speed sensors 42 and 44, respectively, a buffer circuit 64 for switching signals supplying the CPU with switching information with regard to the operation of a throttle valve detected by a throttle sensor 60, on and off of other switches participating in the operation of the automatic transmission detected by switches 62 and setting of the speed changing gear mechanism 14 at the neutral position detected by a neutral starter switch 46, a solenoid energizing circuit 66 adapted to be electronically operated by the CPU for shifting the speed stages of the speed change gear mechanism 14, and a solenoid energizing circuit 68 adapted to be electronically operated by the CPU for locking up the center differential device 16. The diagnostic system for detecting a failure of the rotational speed sensors 42 and 44 is constructed by a part of the CPU and an indicator 70 for warning a failure of the rotational speed sensor 42 or 44.

Figure 2:
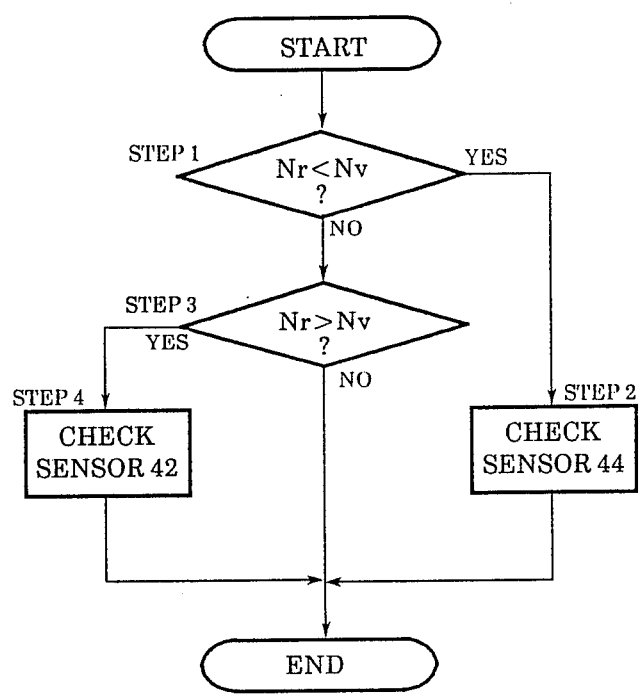
FIG. 2 is a flow chart showing the operation of a first means forming a part of the diagnostic system according to the present invention.

As shown in the flow chart of FIG. 2 in the form of operation, the diagnostic system for detecting a failure of the rotational speed sensors 42 and 44 comprises a first means for comparing an output signal of the rotational speed sensor 44 which detects the rotational speed of the one output rotational member 34 of the central differential device 16 with an output signal of the rotational speed sensor 42 which detects the rotational speed of the input rotational member 28 of the central differential device 16. In the process shown in FIG. 2, after start, in step 1 it is checked if the rotational speed Nv of the input rotational member 28 based upon the output signal of the rotational speed sensor 42 is lower than the rotational speed Nr of the output rotational member 34 based upon the output signal of the rotational speed sensor 44. Then, if Nr is smaller than Nv, the process proceeds to step 2, whereas if Nr is not smaller than Nv, the process proceeds to step 3. In step 3, it is checked if Nr is greater than Nv, and if the answer is yes the process proceeds to step 4, whereas if the answer is no the process proceeds toward end. In step 2, the sensor 44 is diagnosed by a second means incorporated in the diagnostic system of the present invention according to a process such as shown in FIG. 3 as described hereinunder. In step 4, the sensor 42 is diagnosed by a third means incorporated in the diagnostic system of the present invention according to a process such as shown in FIG. 5 as described hereinunder. When Nr is neither smaller not greater than Nv, that is, Nr is equal to Nv, of course it is not necessary to do any diagnosis because the two rotational speed sensors are certainly operating to provide the same output. However, the diagnostic system according to the present invention may be constructed so as to detect a failure of at least the rotational speed sensor 44. Therefore, in the flow chart shown in FIG. 2 the steps 3 and 4 are a further option above the basic concept of the present invention.

Now the second means incorporated in the diagnostic system according to the present invention will be described in the form of its operation expressed in a flow chart shown in FIG. 3. From the condition that the rotational speed Nr of the output rotational member 34 is lower than the rotational speed Nv of the input rotational member 28 it is a matter of course that the input rotational member 28 is rotating. In step 101, it is checked if Nv is equal to or greater than Nvset, a minimum value predetermined for the rotational speed of the input rotational member 28 corresponding a lowest vehicle speed suitable for carrying out the diagnosis of the rotational speed sensors. If the answer is no, the process proceeds to step 102, wherein flags Fr and Ft are both reset to zero. If the answer of the comparison in step 101 is yes, the process proceeds to step 103. In step 103, it is checked if the rotational speed Nr of the rotational speed sensor 44 based upon the output signal thereof is zero. If the answer is no, the process proceeds to step 102, whereas if the answer is yes, the process proceeds to step 104.

In step 104 it is checked if the flag Ft is zero. If the answer is yes, the process proceeds to step 105, whereas if the answer is no, the process proceeds to step 106 by skipping step 105. In step 105, a time count T of a timer is reset to zero and the flag Ft is set to 1. Then the process proceeds to step 106. In step 106, it is checked if the time count T is equal to or greater than Tset, a time count value predetermined as a minimum period during which the rotational speed of the output rotational member 34 driving the rear wheels may inadvertently go down to zero by the front wheel or wheels idle under slippage so much as to exhaust all rotational power supplied by the engine therethrough. This threshold time Tset may be determined to be 10 seconds for the reasons illustrated in FIG. 4.

Figure 4:
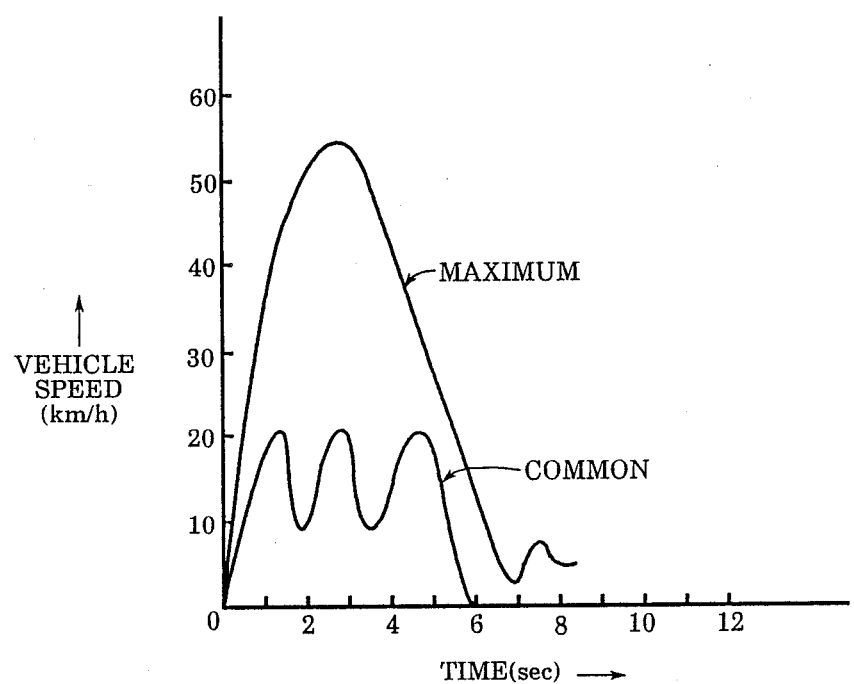
FIG. 4 is a graph showing a general performance of drivers when the traction of the vehicle was lost by slippage occurred in one of the four wheels interconnected via a differential device.

In more detail, FIG. 4 is a graph illustrating how the driver will generally step on the accelerator pedal when the vehicle was trapped in stagnation with one of the four wheels being caught on a slippery road surface or in mud, thus rotating ineffectively while exhausting all rotational power supplied from the engine uselessly therethrough. Most drivers will step on the accelerator pedal repeatedly at a cycle of about 2 seconds probably up to three times as shown in FIG. 4 to such an extent that the slipping wheel rotates at such a speed which allows the speed meter to indicate about 20 km/h, while some other drivers might step on the accelerator pedal more strongly to such an extent that the speed meter indicates more than 50 km/h but probably only one time as shown in FIG. 4. In any event, it would be very rare that the driver continues to step on the accelerator pedal more than 10 minutes at one time under such circumstances. Therefore, if the threshold time Tset is selected to be about 10 seconds, the process of steps 101-106 will be able to discriminate a failure of the rotational speed sensor 44 from an inadvertent loss of the output signal therefrom.

Returning to FIG. 3, if the answer of the comparison in step 106 is yes, the process proceeds to step 107, wherein the flag Fr is set to 1 to indicate that the rotational speed sensor 44 has failed to deliver its output signal, and the flag Ft is reset to zero. When the flag Fr is set to 1, the indicator 70 is put on to indicate that the rotational speed sensor 44 has failed. If the answer of the comparison in step 106 is no, i.e. when the time lapse has not yet exceeded the threshold time Tset, the process proceeds to return and the steps 101-105 are repeated until the time lapses as much as Tset.

When it was detected in the process shown in FIG. 2 that the rotational speed Nv of the input rotational member 28 based upon the output signal of the rotational speed sensor 42 is lower than the rotational speed Nr of the output rotational member 34 based upon the output signal of the rotational speed sensor 44, the process of checking the rotational speed sensor 42 is carried out by the third means incorporated in the diagnostic system of the present invention according to a flow chart shown in FIG. 5. In this case, it is checked in step 201 if the rotational speed Nr of the output rotational member 34 detected by the rotational speed sensor 44 is equal to or greater than Nrset, a minimum value predetermined for the rotational speed of the output rotational member 34 corresponding a lowest vehicle speed suitable for carrying out the diagnosis of the rotational speed sensors. If the answer of the comparison in step 201 is yes, the process proceeds to step 202, whereas if the answer is no, the process proceeds toward return.

When the output rotational member 34 which drives the rear wheels of the vehicle is rotating at a speed equal to or greater than the above-mentioned Nrset, it is certain that the input rotational member 28 of the central differential device 16 is normally rotating. Therefore, in step 202 it is only checked if the rotational speed Nv of the input rotational member 28 based upon the output signal of the rotational speed sensor 42 is zero. If Nv is zero, this means that the rotational speed sensor 42 has failed. Therefore, if so, the process proceeds to step 203 and the flag Fv is set to 1. When the flag Fv is set to 1, the indicator 70 is put on indicate that the rotational speed sensor 42 has failed. If Nv is not zero, the process proceeds to step 204 and the flag Fv is reset to zero.

In the combination of the automatic transmission and the control system shown in FIG. 1 the lock-up clutch 18 may be controlled, as an alternative, based upon the difference between the rotational speed of the output rotational member 32 detected by a rotational speed sensor 42' and the rotational speed of the output rotational member 34 detected by the rotational speed sensor 44. In this case the diagnostic system according to the present invention may be constructed as slightly modified from the embodiment described with reference to FIGS. 2, 3 and 5 so that the rotational speed Nv detected by the rotational speed sensor 42 is replaced by a rotational speed Nf detected by the rotational speed sensor 42'. However, since it is not always correct to conclude that the rotational speed sensor 42' has failed when there is no output from the rotational speed sensor 42' while an output was detected from the rotational speed sensor 44, because there is a case that the rear wheel or wheels are rotating under slippage to exhaust all rotational power therethrough while the front wheels are stagnating, the flow chart for checking the rotational speed sensor 42' will have to be modified from that shown in FIG. 5 for checking the rotational speed sensor 42 applied to the input rotational member 28 to a flow chart similar to that for checking the rotational speed sensor 44 applied to the output rotational member 34.

Figure 6:
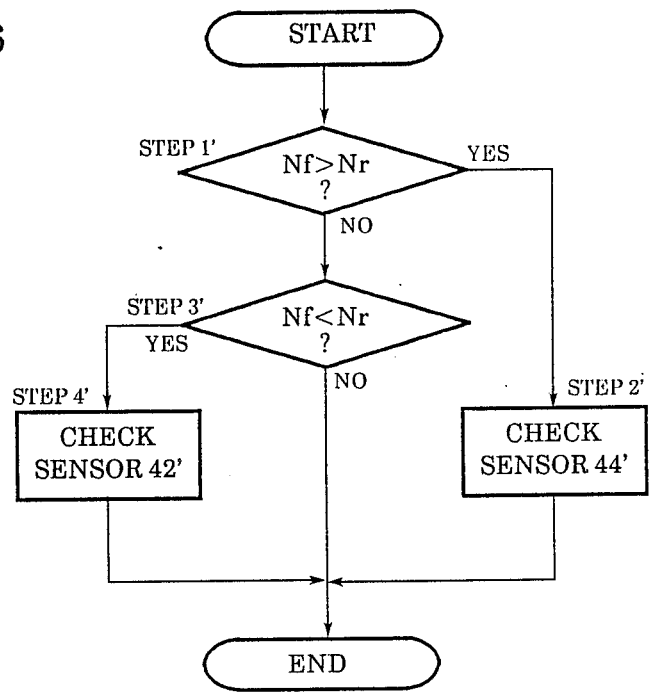
FIG. 6 is a flow chart showing the operation of a modified type of said first means whose operation is shown in FIG. 2.

FIGS. 6, 7 and 8 show such flow charts corresponding to those shown in FIGS. 2, 3 and 5, respectively, illustrating the operation of the second embodiment of the diagnostic system according to the present invention. The processes carried out in the flow chart of FIG. 7 is the same as those in the flow chart of FIG. 3, except that Nv is replaced by Nf. The processes carried out in the flow chart of FIG. 8 are different from those in the corresponding flow chart of FIG. 5, but are similar to those in the flow chart of FIG. 7. Since the construction and the operation of this second embodiment will be clear to those skilled in the art in comparison with those of the first embodiment, further descriptions on this second embodiment will be omitted to avoid redundancy of the specification. It will be noted that in the flow charts of FIGS. 6, 7 and 8 the steps corresponding to those in the preceding flow chart are designated by the same numbers with prime (') or double prime (").

Although the present invention has been described in detail with respect to some preferred embodiments thereof with reference to the accompanying drawings, it will be understood by one skilled in the art that various modifications are possible with respect to these embodiments without departing the scope of the present invention.

We claim:

1. In a four wheels drive vehicle comprising an engine, a transmission, a front wheel drive shaft, a rear wheel drive shaft, a central differential device having an input rotational member adapted to be driven by said engine through said transmission and two output rotational members adapted to drive said front wheel drive shaft and said rear wheel drive shaft, respectively, under distribution of rotational power supplied to said input rotational member between said two output rotational members, a first rotational speed sensor for detecting rotational speed of one of said two output rotational members of said central differential device, and a second rotational speed sensor for detecting rotational speed of either said input rotational member or the other of said two output rotational members of said central differential device, a diagnostic system for detecting failure of at least said first rotational speed sensor, comprising:

a first means for comparing an output signal of said first rotational speed sensor with an output signal of said second rotational speed sensor to detect a first condition that the rotational speed detected by said first rotational speed sensor is lower than the rotational speed detected by said second rotational speed sensor, and a second means operable when said first condition was detected to detect if the rotational speed detected by said first rotational speed sensor is below a threshold value therefor while the rotational speed detected by said second rotational speed sensor is above a threshold value therefor over a first predetermined period so as thereby to determine a failure of said first rotational speed sensor.

2. A diagnostic system according to claim 1, wherein said second rotational speed sensor detects rotational speed of said input rotational member of said central differential device, said first means further detecting a second condition that the rotational speed detected by said second rotational speed sensor is lower than the rotational speed detected by said first rotational speed sensor, further comprising:

a third means operable when said second condition was detected to detect if the rotational speed detected by said second rotational speed sensor is below a threshold value therefor while the rotational speed detected by said first rotational speed sensor is above a threshold value thereof so as thereby to determine a failure of said second rotational speed sensor.

3. A diagnostic system according to claim 1, wherein said second rotational speed sensor detects rotational speed of the other of said two output rotational members of said central differential device, said first means further detecting a second condition that the rotational speed detected by said second rotational speed sensor is lower than the rotational speed detected by said first rotational speed sensor, further comprising:

a fourth means operable when said second condition was detected to detect if the rotational speed detected by said second rotational speed sensor is below a threshold value therefor while the rotational speed detected by said first rotational speed sensor is above a threshold value therefor over a second predetermined period so as thereby to determine a failure of said second rotational speed sensor.

4. A diagnostic system according to claim 1, wherein said first predetermined period is set to be about 10 seconds.

5. A diagnostic system according to claim 3, wherein said first and said second predetermined period are set to be about 10 seconds, respectively.

* * * * *